(12) United States Patent
Ozaki et al.

(10) Patent No.: US 8,192,887 B2
(45) Date of Patent: Jun. 5, 2012

(54) FUEL CELL

(75) Inventors: Toru Ozaki, Chiba (JP); Fumiharu Iwasaki, Chiba (JP); Kazutaka Yuzurihara, Chiba (JP); Takafumi Sarata, Chiba (JP); Tsuneaki Tamachi, Chiba (JP); Norimasa Yanase, Chiba (JP); Noboru Ishisone, Chiba (JP)

(73) Assignee: Seiko Instruments Inc. (JP)

( * ) Notice: Subject to any disclaimer, the term of this patent is extended or adjusted under 35 U.S.C. 154(b) by 392 days.

(21) Appl. No.: 12/312,991

(22) PCT Filed: Dec. 21, 2007

(86) PCT No.: PCT/JP2007/074719
§ 371 (c)(1),
(2), (4) Date: Jun. 3, 2009

(87) PCT Pub. No.: WO2008/099567
PCT Pub. Date: Aug. 21, 2008

(65) Prior Publication Data
US 2010/0015488 A1    Jan. 21, 2010

(30) Foreign Application Priority Data

Feb. 16, 2007 (JP) .................................. 2007-037161
Jul. 10, 2007 (JP) .................................. 2007-181263

(51) Int. Cl.
*H01M 2/38* (2006.01)
(52) U.S. Cl. .................................................... 429/458
(58) Field of Classification Search .................. 429/458, 429/455, 401, 535, 514
See application file for complete search history.

(56) References Cited

U.S. PATENT DOCUMENTS

| 6,159,629 | A | 12/2000 | Gibb et al. ...................... 429/39 |
| 7,867,660 | B2* | 1/2011 | Mitsuta .......................... 429/414 |
| 2005/0042497 | A1* | 2/2005 | Ronne et al. ..................... 429/38 |
| 2006/0199054 | A9* | 9/2006 | Gallagher et al. ............... 429/26 |
| 2007/0087176 | A1* | 4/2007 | Dadheech et al. ............. 428/216 |
| 2007/0117005 | A1* | 5/2007 | Fuglevand et al. .............. 429/40 |
| 2007/0122680 | A1* | 5/2007 | Eun et al. ......................... 429/35 |
| 2008/0032174 | A1* | 2/2008 | Fuglevand et al. .............. 429/33 |
| 2008/0050629 | A1* | 2/2008 | Lin et al. .......................... 429/26 |
| 2011/0039164 | A1* | 2/2011 | Akers et al. .................... 429/401 |

FOREIGN PATENT DOCUMENTS

JP             60-194872        12/1985
(Continued)

*Primary Examiner* — Jean F Duverne
(74) *Attorney, Agent, or Firm* — Adams & Wilks

(57) ABSTRACT

A fuel cell has cell units and a manifold for uniformly supplying an anode fluid to each of the cell units. The manifold has a feed port through which an anode fluid is supplied, a first buffer section in fluid communication with the feed port for receiving the anode fluid and for reducing a flow rate of the anode fluid, a second buffer section in fluid communication with the first buffer section for receiving the anode fluid from the first buffer section at the reduced flow rate and for further reducing the flow rate of the anode fluid, and a block group formed of blocks spaced apart from one another to form flow channels in fluid communication with the second buffer section and through which the anode fluid at the further reduced flow rate flows. An array of fine openings is disposed in fluid communication with the cell units for receiving the anode fluid at the further reduced flow rate flowing through the flow channels so that the anode fluid is uniformly supplied to each of the cell units.

22 Claims, 15 Drawing Sheets

FOREIGN PATENT DOCUMENTS

| | | |
|---|---|---|
| JP | 63-181271 | 7/1988 |
| JP | 64-9360 | 1/1989 |
| JP | 01-281682 | 11/1989 |
| JP | 02-170371 | 7/1990 |
| JP | 03-252061 | 11/1991 |
| JP | 04-121969 | 4/1992 |
| JP | 04-196062 | 7/1992 |
| JP | 04-289674 | 10/1992 |
| JP | 09-161828 | 6/1997 |
| JP | 2002-532855 | 10/2002 |
| JP | 2003-059524 | 2/2003 |
| WO | 2006064922 | 6/2006 |

* cited by examiner (a)

(b)

FUEL CELL

CROSS-REFERENCE TO RELATED APPLICATION

This application is a U.S. national stage application of International Application No. PCT/JP2007/074719, filed Dec. 21, 2007, claiming a priority date of Feb. 16, 2007, and published in a non-English language.

BACKGROUND OF THE INVENTION

1. Technical Field

This invention relates to a fuel cell in which an anode fluid is supplied from a manifold to each cell of a cell stack.

2. Background Art

With increasing consciousness of energy problems in recent years, there has been a demand for a power source or power supply having a higher energy density and involving clean emissions. Fuel cells are power generators having an energy density several times that of existing batteries, and are characterized in that they have a high energy efficiency, and give off no or few nitrogen oxides or sulfur oxides as contained in emission gases. Thus, the fuel cell is a very effective device which fulfills requirements for a next-generation power supply device.

The unit cell of the fuel cell has an anode-side catalyst body (anode) and a cathode-side catalyst body (cathode) on both sides of a solid polymer electrolyte membrane as an electrolyte membrane. Separators, on each of which an anode fluid channel and a cathode fluid channel are formed back to back, and the unit cells are arranged alternately to form cells. A plurality of the cells are stacked to constitute a cell stack. With the fuel cell of such a stack structure, fuel is uniformly distributed to each cell, and fuel supply is performed uniformly in the cell stack. For this purpose, a manifold is provided, and fuel from the manifold is supplied to each cell.

If fuel supply to each cell of the cell stack becomes nonuniform, variations occur in the output of each cell, power efficiency or electrical efficiency lowers, and the output of the entire cell stack is influenced by the output of the cell with a low output. Thus, the manifold is required to realize uniform distribution performance of a high order for the supply of fuel to each cell of the cell stack.

Under these circumstances, various proposals have been made for a technology for uniformly supplying fuel to each cell of a cell stack (see, for example, Patent Document 1 to be described below). In Patent Document 1, a manifold for supplying fuel is composed of a space for diffusion (second space) adjacent to the cell stack, and a first space to be supplied with a hydrogen-rich gas as a fuel. The hydrogen-rich gas supplied into the first space is sent through a through-hole to the second space, diffused in the second space, and supplied to each cell.

Since the hydrogen-rich gas is diffused in the second space, a variation between the amount of supply to the cell close to the through-hole and the amount of supply to the cell distant from the through-hole is decreased. Consequently, the hydrogen-rich gas is supplied uniformly to the cells of the entire cell stack.

According to the conventional technology, however, the hydrogen-rich gas needs to be diffused in the second space, thus requiring that the proportion of the volume of the second space be rendered high with respect to the total volume of the first space and the second space combined. Unless some distance from the through-hole to the cells is ensured, therefore, there will be variations in the amount of supply depending on the positional relationship between the through-hole and each cell. Thus, the upsizing of the manifold has been unavoidable for the uniform supply of the hydrogen-rich gas to each cell.

Patent Document 1: JP-A-9-161828

SUMMARY OF THE INVENTION

The present invention has been accomplished in the light of the above-described situations. It is an object of the invention to provide a fuel cell in which an anode fluid can be uniformly supplied to each cell even when a manifold is downsized.

The fuel cell in one embodiment of the present invention, is a fuel cell, comprising: unit cells each having an anode and a cathode joined together via an electrolyte membrane; a cell stack having a plurality of cells stacked, each of the cells having the unit cell and a separator provided with an anode fluid channel; and a manifold for supplying an anode fluid to a position of the cell which the anode fluid channel faces. The manifold comprises a top plate provided with an introduction port through which the anode fluid is introduced, and a bottom plate provided with a plurality of fine openings facing the anode fluid channels, a flow-through space for the anode fluid being formed between an inner surface of the top plate and an upper surface of the bottom plate, a block group having a channel formed for dispersing the anode fluid, which has been supplied from the introduction port, to the fine openings is provided on the upper surface of the bottom plate between a projection part of the introduction port and the fine openings, and the anode fluid supplied from the introduction port is brought into contact with the projection part on the upper surface of the bottom plate to lower a flow velocity of the anode fluid, and the anode fluid having the flow velocity lowered is flowed through the channel of the block group, and dispersed to the fine openings.

According to this feature, the anode fluid supplied from the introduction port is brought into contact with the projection part on the upper surface of the bottom plate to lower the flow velocity of the anode fluid, and the anode fluid having the flow velocity lowered is flowed through the channel of the block group, and dispersed to the fine openings. Thus, the anode fluid can be dispersed to the plurality of fine openings in the limited flow-through space. Consequently, even if the manifold is downsized, the anode fluid can be uniformly supplied to each of the cells.

In another embodiment of the fuel cell of the present invention, a plurality of the channels are formed in the block group, and widths of the channels distant from the projection part are larger than widths of the channels close to the projection part.

According to the above feature, the widths of the channels distant from the projection part where the anode fluid is sent are rendered large. Thus, the flow-through resistance in the distant channels is low, facilitating flow-through. Consequently, the anode fluid can be uniformly sent from the plurality of channels to the fine openings, irrespective of the distance from the projection part.

In the foregoing embodiment of the fuel cell of the present invention, a plurality of the channels are formed in the block group, and the lengths of the channels distant from the projection part are smaller than the lengths of the channels close to the projection part.

According to the above feature, the lengths of the channels distant from the projection part where the anode fluid is sent are rendered small. Thus, flow-through pressure losses in the distant channels are small, facilitating flow-through. Consequently, the anode fluid can be uniformly sent from the plurality of channels to the fine openings, irrespective of the distance from the projection part.

In another embodiment of the fuel cell of the present invention, a separating plate is provided for separating the flow-through space, which is on a side opposite to the fine openings across the block group, into a plurality of spaces in a direction of parallel arrangement of the fine openings, and for portioning out the anode fluid between the plurality of spaces.

According to the above feature, the anode fluid is portioned out between the plurality of spaces by the separating plate. Thus, the anode fluid can be dispersed in a uniform state to the plurality of fine openings.

In another embodiment of the fuel cell of the present invention, a plurality of the introduction ports are provided along a direction of parallel arrangement of the fine openings.

According to the above feature, the anode fluid is sent from the plurality of introduction ports. Thus, the anode fluid can be reliably dispersed to the plurality of fine openings.

In the foregoing fuel cell of the present invention, a separating wall is provided for separating the flow-through space into a plurality of spaces in the direction of parallel arrangement of the fine openings in correspondence with the plurality of introduction ports.

According to the above feature, the anode fluid is sent from the plurality of introduction ports to the plurality of spaces. Thus, the anode fluid can be dispersed reliably and uniformly to the plurality of fine openings.

In another embodiment of the fuel cell of the present invention, a fluid blocking wall is provided in the flow-through space on a side opposite to the block group across the fine openings.

According to the above feature, the anode fluid, which has flowed through the block group, is sent to the plurality of fine openings in the flow-through space which has been made a narrow space between the block group and the fluid blocking wall. Thus, the supply pressure is fully ensured, and the anode fluid can be reliably supplied to the fine openings.

In the foregoing fuel cell of the present invention, a distance from the block group to the introduction port is more than a half of a distance from the block group to an end of the flow-through space, with the introduction port being interposed between the block group and the end of the flow-through space.

According to the above feature, an adequate distance from the block group to the introduction port can be ensured in the limited flow-through space. Thus, the anode fluid can be sufficiently dispersed.

In another embodiment, a fuel cell of the present invention is a fuel cell, comprising: unit cells each having an anode and a cathode joined together via an electrolyte membrane; a cell stack having a plurality of cells stacked, each of the cells having the unit cell and a separator provided with an anode fluid channel; and a manifold for supplying an anode fluid to a position of the cell which the anode fluid channel faces, characterized in that the manifold comprises a top plate provided with an introduction port through which the anode fluid is introduced, a bottom plate provided with a plurality of fine openings facing the anode fluid channels, a flow-through space for the anode fluid being formed between an inner surface of the top plate and an upper surface of the bottom plate, and a partition plate for partitioning the flow-through space into a first space on a side of the top plate and a second space on a side of the bottom plate, and the partition plate having a second introduction port at a position different from a position of a projection part of the introduction port, a block group having a channel formed for dispersing the anode fluid, which has been supplied from the second introduction port, to the fine openings is provided on the upper surface of the bottom plate between a second projection part of the second introduction port and the fine openings, and a flow velocity of the anode fluid supplied from the introduction port is lowered in the first space, and the anode fluid having the flow velocity lowered is passed through the second introduction port and brought into contact with the second projection part on the upper surface of the bottom plate to lower the flow velocity of the anode fluid, and the anode fluid having the flow velocity lowered is flowed through the channel of the block group, and dispersed to the fine openings.

According to the above feature, the flow velocity of the anode fluid supplied from the introduction port is lowered in the first space, and the anode fluid having the flow velocity lowered is passed through the second introduction port and brought into contact with the second projection part on the upper surface of the bottom plate to lower the flow velocity of the anode fluid further, and the anode fluid having the flow velocity sufficiently lowered is flowed through the channel of the block group, and dispersed to the fine openings. Thus, the anode fluid can be dispersed to the plurality of fine openings in the limited flow-through space. Consequently, even if the manifold is downsized, the anode fluid can be uniformly supplied to each cell composed of the unit cell and the separator.

In the fuel cell of the foregoing embodiment of the present invention, a channel area of the second introduction port is larger than a channel area of the introduction port.

According to the above feature, the anode fluid has a decrease in speed promoted when passing through the second introduction port having a large channel area.

In the fuel cell of the foregoing embodiment of the present invention, a plurality of the channels are formed in the block group, and widths of the channels distant from the second projection part are larger than widths of the channels close to the second projection part.

According to the above feature, the widths of the channels distant from the second projection part where the anode fluid sufficiently decreased in speed is sent are rendered large. Thus, the flow-through resistances in the distant channels are low, facilitating flow-through. Consequently, the anode fluid can be uniformly sent from the plurality of channels to the fine openings, irrespective of the distances from the second projection part.

In the fuel cell of the foregoing embodiment of the present invention, a plurality of the channels are formed in the block group, and lengths of the channels distant from the second projection part are smaller than lengths of the channels close to the second projection part.

According to the above feature, the lengths of the channels distant from the second projection part where the anode fluid sufficiently decreased in speed is sent are rendered small. Thus, flow-through pressure losses in the distant channels are small, facilitating flow-through. Consequently, the anode fluid can be uniformly sent from the plurality of channels to the fine openings, irrespective of the distances from the second projection part.

In the fuel cell of the foregoing embodiment of the present invention, a separating plate is provided for separating the second space, which is on a side opposite to the fine openings across the block group, into a plurality of spaces in a direction of parallel arrangement of the fine openings, and for portioning out the anode fluid between the plurality of spaces.

According to the above feature, the anode fluid is portioned out between the plurality of spaces by the separating plate. Thus, the anode fluid can be dispersed in a uniform state to the plurality of fine openings.

In the fuel cell of the foregoing embodiment of the present invention, the partition plate is provided with a plurality of the second introduction ports along a direction of parallel arrangement of the fine openings.

According to the above feature, the anode fluid is sent from the plurality of second introduction ports. Thus, the anode fluid can be reliably dispersed to the plurality of fine openings.

In the fuel cell of the foregoing embodiment of present invention, a separating wall is provided for separating the second space into a plurality of spaces in the direction of parallel arrangement of the fine openings in correspondence with the second introduction port.

According to the above feature, the anode fluid is sent from the plurality of second introduction ports to the plurality of spaces. Thus, the anode fluid can be dispersed reliably and uniformly to the plurality of fine openings.

In the fuel cell of the foregoing embodiment of the present invention a fluid blocking wall is provided on a side opposite to the block group across the fine openings.

According to the above feature, the anode fluid, which has flowed through the block group, is sent to the plurality of fine openings in the second space which has been made a narrow space between the block group and the fluid blocking wall. Thus, the supply pressure is fully ensured, and the anode fluid can be reliably supplied to the fine openings.

In the fuel cell of the foregoing embodiment of the present invention a distance from the block group to the second introduction port is more than a half of a distance from the block group to an end of the second space, with the second introduction port being interposed between the block group and the end of the second space.

According to the above feature, an adequate distance from the block group to the introduction port can be ensured in the limited second space. Thus, the anode fluid can be sufficiently dispersed.

In the fuel cell of the foregoing embodiments of the present invention the anode fluid sent from the fine openings heads in a direction intersecting a direction of the anode fluid flowing through the channel of the block group.

According to the above feature, the anode fluid, which has passed through the block group, can be changed in the supply direction, and supplied from the fine openings to the cells.

The fuel cell of the present invention enables the anode fluid to be uniformly supplied to each cell even when the manifold is downsized.

DETAILED DESCRIPTION OF THE PREFERRED EMBODIMENT

A first embodiment of the present invention will be described based on FIGS. 1 to 9.

Figure 1:
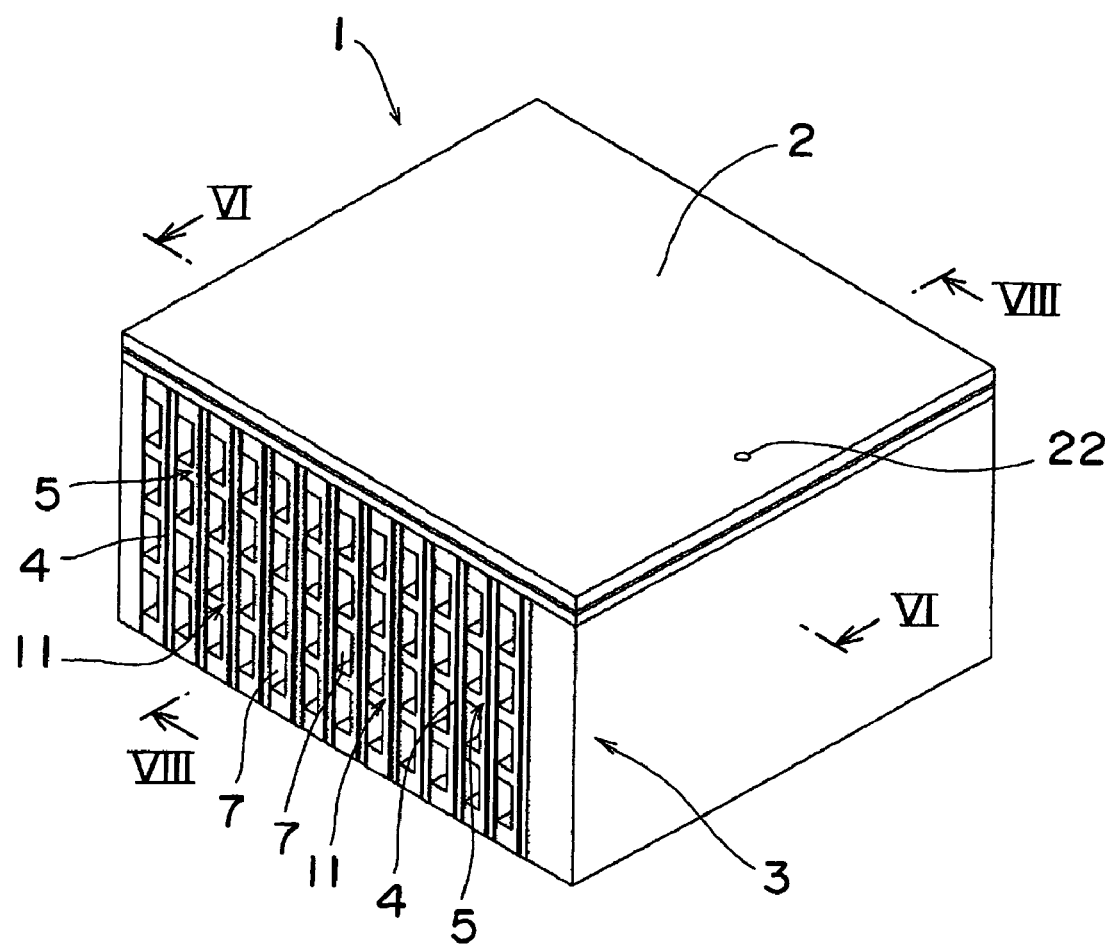
FIG. 1 is a perspective view of a fuel cell according to a first embodiment of the present invention.
Figure 2:
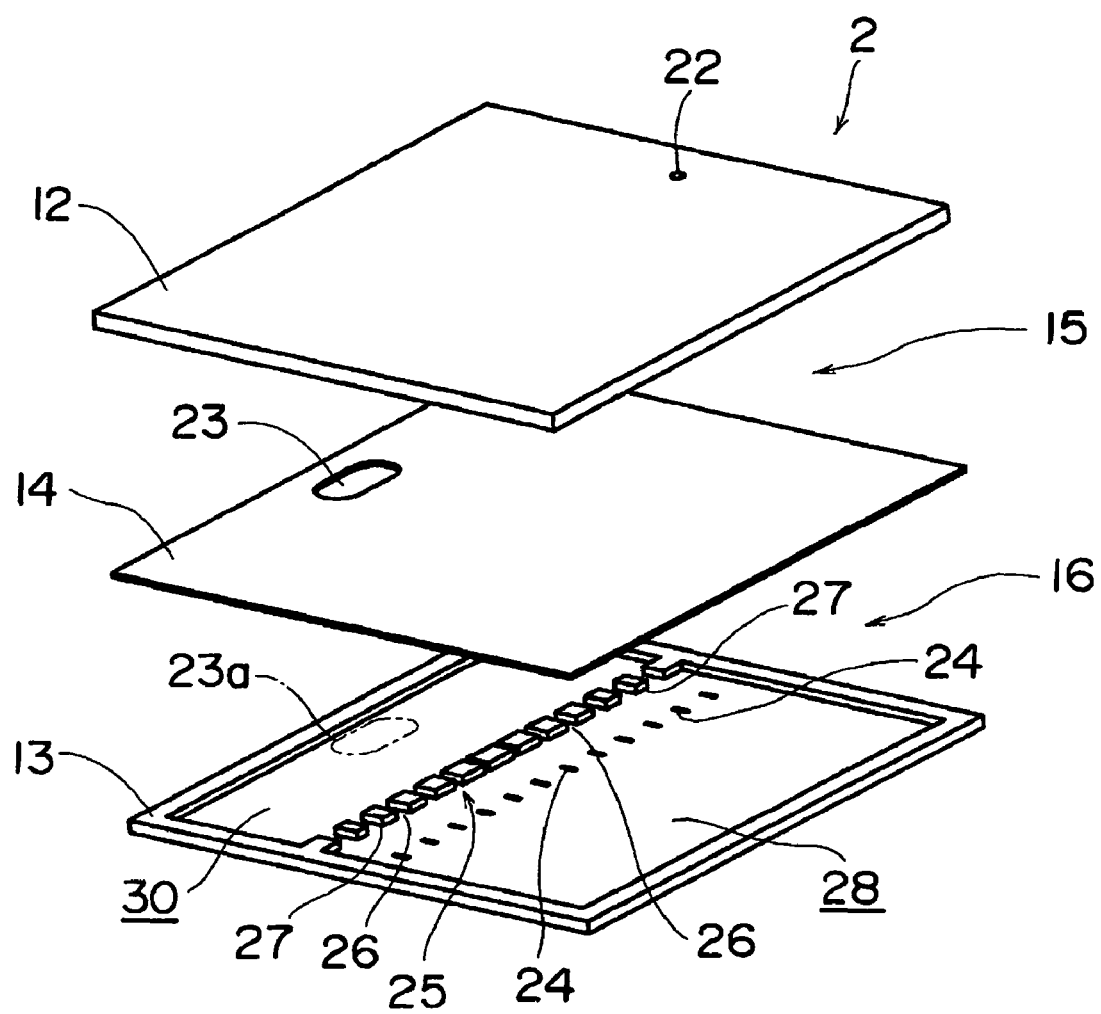
FIG. 2 is an exploded perspective view of an external manifold.
Figure 4:
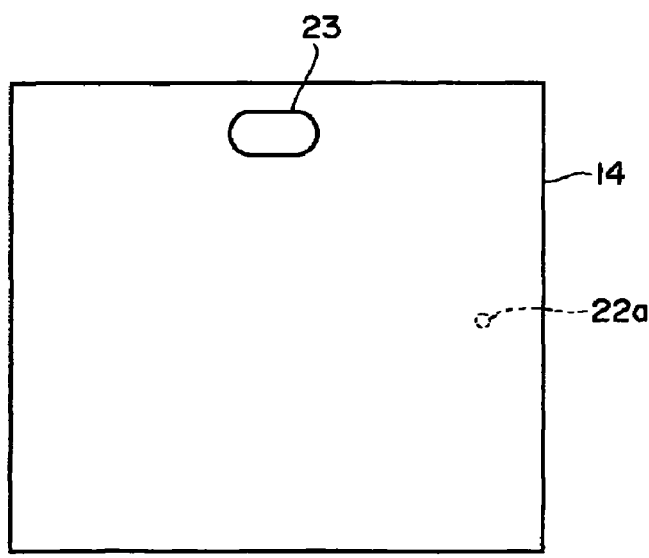
FIG. 4 is a front view of a partition plate.
Figure 5:
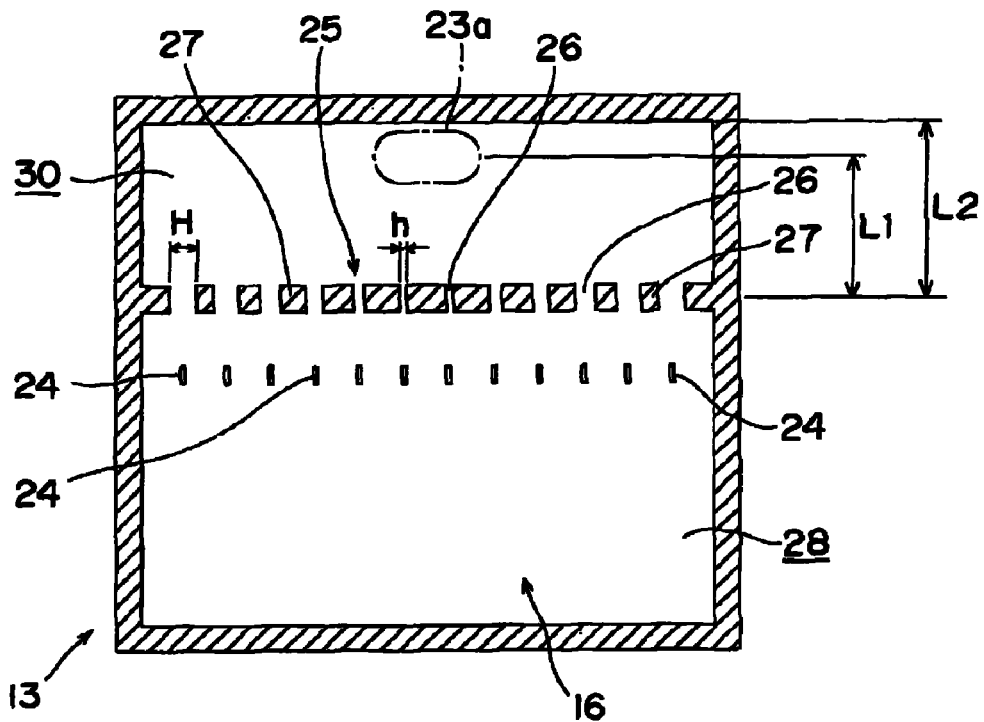
FIG. 5 is a partial cross-sectional view of the inner surface of a bottom plate.
Figure 6:
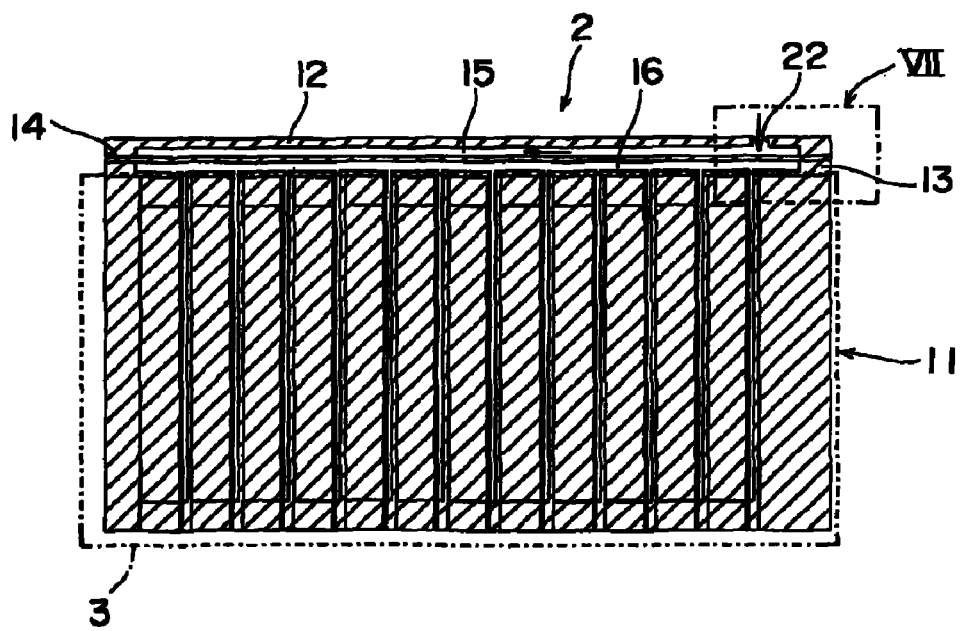
FIG. 6 is a view taken on line VI-VI in FIG. 1.
Figure 7:
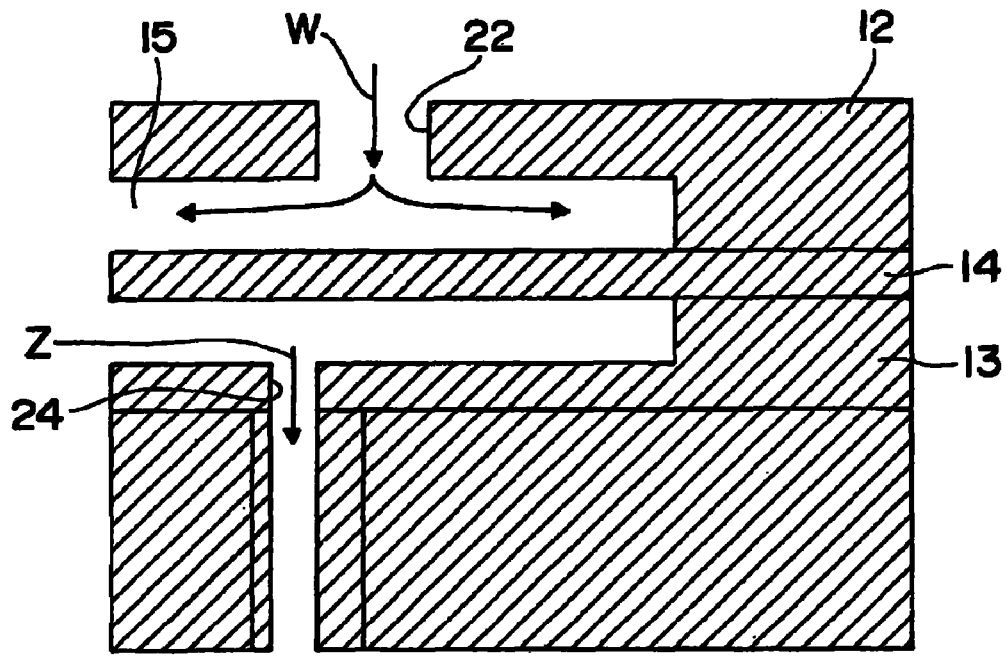
FIG. 7 is a detail view in cross-section of a portion indicated by an arrow VII in FIG. 6.
Figure 8:
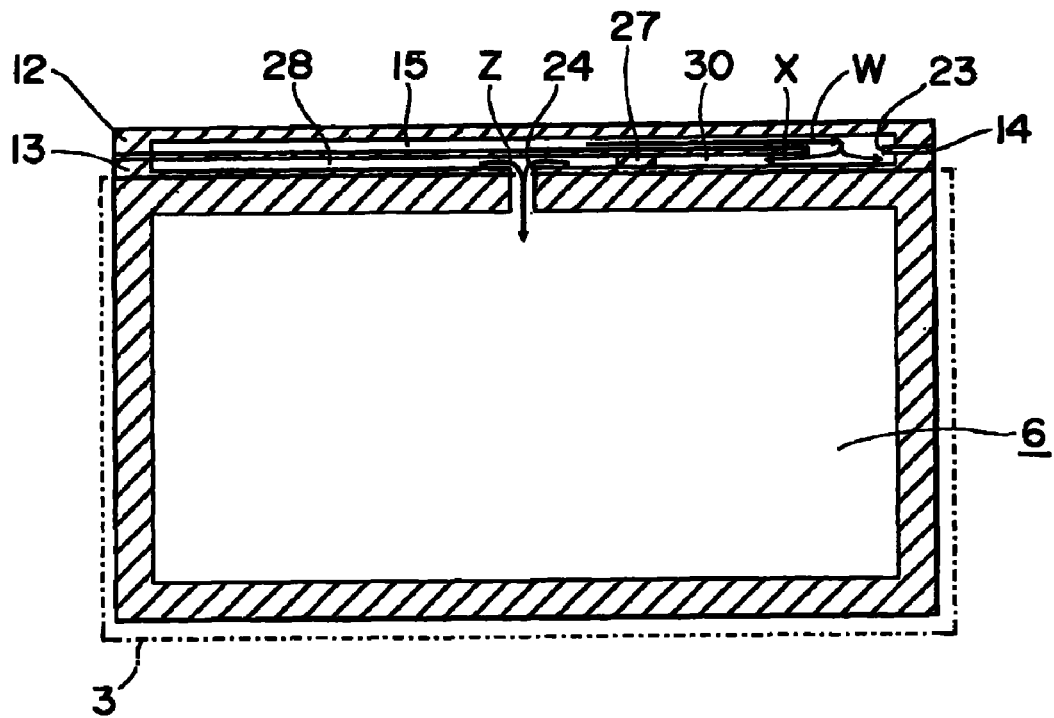
FIG. 8 is a cross-sectional view taken on line VIII-VIII in FIG. 1.
Figure 9:
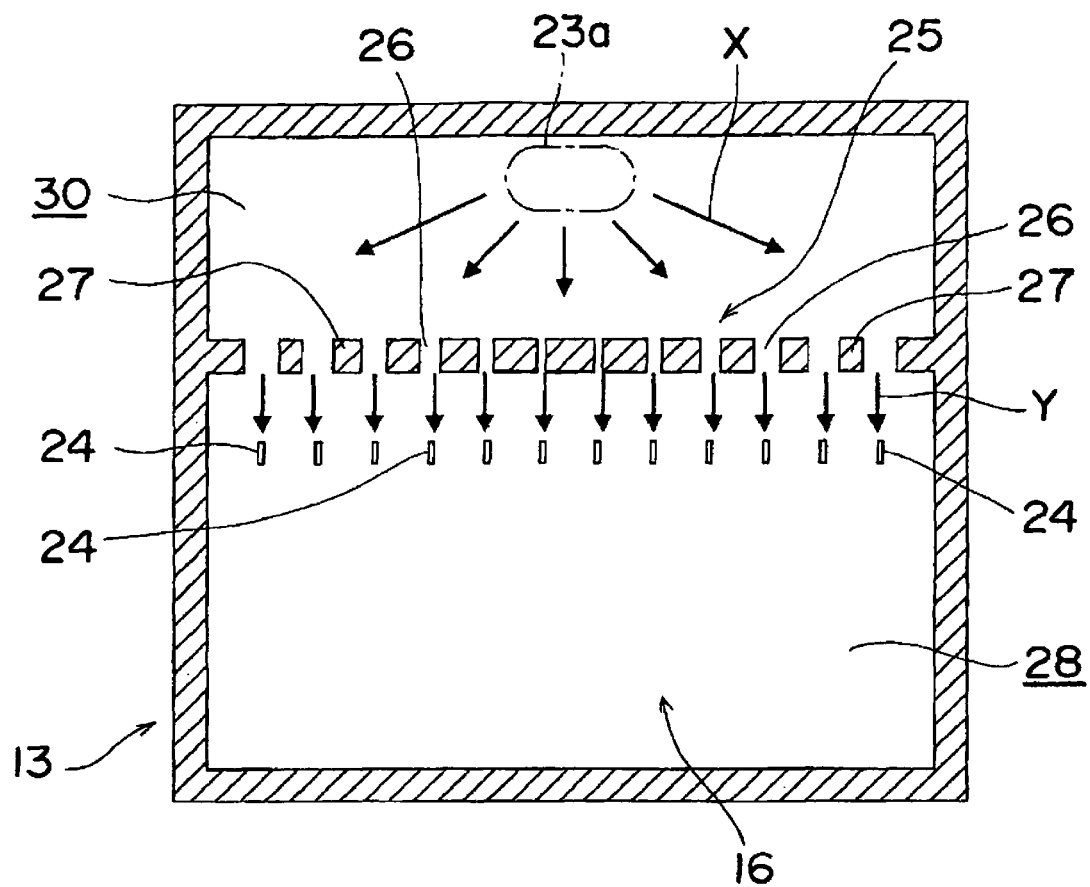
FIG. 9 is a partial cross-sectional view of the inner surface of the bottom plate, showing the status of fuel flowing on the bottom plate.

FIG. 1 shows the appearance of a fuel cell according to a first embodiment of the present invention. FIG. 2 shows an exploded perspective of an external manifold. FIGS. 3(a) and 3(b) show the appearance of a top plate, FIG. 3(a) showing the plan state of the top plate, and FIG. 3(b) showing a state as viewed along line III-III in FIG. 3(a). FIG. 4 shows the appearance of a partition plate. FIG. 5 shows the appearance of the inner surface of a bottom plate. FIG. 6 shows a state as viewed along line VI-VI in FIG. 1. FIG. 7 shows the details of a portion indicated by an arrow VII in FIG. 6. FIG. 8 shows a state as viewed along line VIII-VIII in FIG. 1. FIG. 9 shows the status of a fuel flowing on the bottom plate.

As shown in the drawings, a fuel cell 1 of the present embodiment is equipped with an external manifold 2 as a manifold to be fed with a fuel (hydrogen) as an anode fluid, and hydrogen is supplied from the external manifold 2 to a cell stack 3. To the external manifold 2, a fuel supply portion (not shown), which supplies hydrogen obtained, for example, from a hydrogen absorbing alloy, is connected. A control circuit (not shown) is connected to a power generation portion of the cell stack 3.

Each of unit cells 4 of the cell stack 3 is a membrane electrode assembly having an anode-side catalyst body (anode) and a cathode-side catalyst body (cathode) provided on both sides of a solid polymer electrolyte membrane as an electrolyte membrane. Separators 5, on each of which an anode fluid channel 6 (shown in FIG. 8 to be described later) and a cathode fluid channel 7 are formed back to back, and the unit cells 4 are arranged alternately to form cells 11. A plurality of the cells 11 are stacked to constitute a cell stack 3. With the fuel cell 1 of such a stack structure, hydrogen is uniformly distributed to the anode fluid channels 6 (shown in FIG. 8 to be described later) of the separators 5 stacked in the respective cells 11 to perform uniform supply of hydrogen in the cell stack 3. For this purpose, the external manifold 2 is provided. The separator 5 is not limited to a shape in which the anode fluid channel 6 (shown in FIG. 8 to be described later) and the cathode fluid channel 7 are formed back to back, but may be in a shape in which the anode fluid can be supplied to the anode, while the cathode fluid can be supplied to the cathode.

The external manifold 2 will be described based on FIGS. 2 to 5.

As shown in FIG. 2, the external manifold 2 has a top plate (first plate member) 12 and a bottom plate (second plate member) 13, and a flow-through space for hydrogen is formed between the inner surface of the top plate 12 and the upper surface of the bottom plate 13. A partition plate (third plate member) 14 is provided between the top plate 12 and the bottom plate 13, and the flow-through space for hydrogen is partitioned by the partition plate 14 into a first space (first buffer section) 15 on the side of the top plate 12 and a second space 16 on the side of the bottom plate 13.

Figure 3:
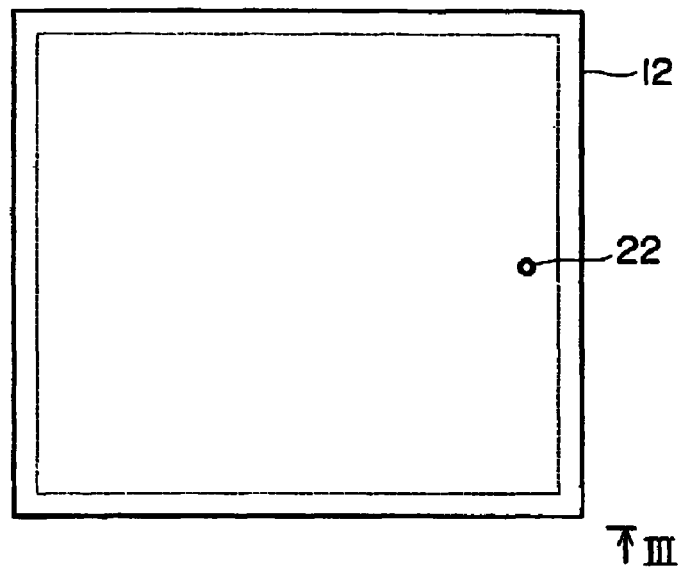
FIGS. 3(a) and 3(b) are front and side views of a top plate.
Figure 3:

As shown in FIGS. 2 and 3, a concavity 21 for forming the flow-through space is formed in the inner surface of the top plate 12, and the top plate 12 is provided with an introduction port (feed port) 22 for introduction of hydrogen. A fuel supply portion (not shown) is connected to the introduction port 22. As shown in FIGS. 2 and 4, the partition plate 14 is provided with a communication port 23 as a second introduction port, and the position of the communication port 23 is designed to be a position different from the position of a projection part 22a of the introduction port 22 in a stacking direction. The position of the introduction port 22 is preferably provided to be a position where the projection part 22a is most distant from the communication port 23.

As shown in FIGS. 2 and 5, hydrogen is supplied toward the upper surface of the bottom plate 13 through the communication port 23 of the partition plate 14, and the supplied hydrogen is brought into contact with the upper surface of the bottom plate 13 in a projection part 23a (second projection part) of the communication port 23 in the stacking direction, and is supplied to the second space 16. A plurality of (12 in the illustrated embodiment) fine openings 24 facing the anode fluid channels of the cells 11 (see FIG. 1) are formed in the upper surface of the bottom plate 13. The fine openings 24 are formed, for example, such that one of or a plurality of the fine openings 24 is or are formed per cell 11 (see FIG. 1).

In the illustrated embodiment, an example of forming 12 of the fine openings 24 in a row is described. However, it is possible to form a multiplicity of the fine openings 24, such as 12 of the fine openings 24 each in three rows.

A block group 25 is formed on the upper surface of the bottom plate 13 between the projection part 23a and the fine openings 24, and channels 26 (flow channels) for dispersing hydrogen, which has been supplied from the communication port 23, to the fine openings 24 are formed by the block group 25. The second space 16 formed by the bottom plate 13 and the partition plate 14 is divided into a first recessed section 30 (second buffer section) on the side of the projection part 23a and a second recessed section 28 on the side of the fine openings 24, with the block group 25 being the boundary between the first recessed section 30 and the second recessed section 28.

The position of the communication port 23, namely, the position of the projection part 23a shown in FIG. 5, is set to be such that a distance L1 from the block group 25 to the projection part 23a is close to the same distance as a distance L2 from the block group 25 to the end of the first recessed section 30, which is the end of the second space, with the projection part 23a being interposed in the distance L2. That is, the distance L1 from the block group 25 to the projection part 23a is set to be more than a half of the distance L2 from the block group 25 to the end of the first recessed section 30.

Since the distance L1 from the block group 25 to the projection part 23a is set to be more than a half of the distance L2 from the block group 25 to the end of the first recessed section 30, the distance over which hydrogen supplied from the communication port 23 is guided to each channel 26 of the block group 25 can be ensured amply. Thus, dispersion of hydrogen within the first recessed section 30, which is a limited space, can be performed appropriately.

As shown in FIG. 5, the block group 25 comprises a plurality of blocks 27 arranged parallel, and the channels 26 are defined between the blocks 27. The widths (in the right-and-left direction in the drawing) of the blocks 27 close to the projection part 23a are larger than the widths of the blocks 27 distant from the projection part 23a. In other words, the width H of the channel 26 distant from the projection part 23a is larger than the width h of the channel 26 close to the projection part 23a, and a pressure loss in the channel 26 distant from the projection part 23a is rendered smaller.

The widths of the plurality of blocks 27 of the block group 25 can be set to be the same to render the widths of the channels the same spacing. The illustrated embodiment shows a state in which the fine openings 24 and the channels 27 correspond in a one-to-one relation, but they need not necessarily be provided to correspond.

Because of the above configuration, the amounts of hydrogen flowing from the channels 26 to the fine openings 24 are distributed uniformly, regardless of the distances from the projection part 23a. Hydrogen distributed uniformly to the fine openings 24 flows downward (in a direction intersecting the direction of flow through the channel 26) from the fine openings 24, and is supplied to the anode fluid channel 6 (shown in FIG. 8 to be described later) of each cell 11 (see FIG. 1).

In the above-mentioned embodiment, the partition plate 14 is provided to partition the flow-through space for hydrogen, which is formed by the top plate 12 and the bottom plate 13, into the first space 15 and the second space 16. However, it is possible to divide the flow-through space for hydrogen into the first recessed section 30 and the second recessed section 28, without providing the partition plate 14. In this case, the position of the introduction port 22 is a position corresponding to the first recessed section 30. Thus, hydrogen from the introduction port 22 has a flow velocity that is slowed or reduced upon contact with a projection part of the introduction port 22, flows from the first recessed section 30 through the channels 26 of the block group 25, and is sent to the fine openings 24. On this occasion, the flow-through area of the introduction port 22 can be rendered large. In relation to instruments for connection to the outside, the introduction port 22 is preferably small. Thus, the introduction port 22 can be in a shape in which its channel area gradually increases from the entrance toward the exit in the path direction of the introduction port 22. Furthermore, the introduction direction of hydrogen is not limited to being from above the top plate 12, but the introduction direction can be another direction, such as a transverse direction.

The feature that no partition plate is provided can be applied to all of the embodiments shown below.

The flow-through status of hydrogen will be described based on FIGS. 6 to 9.

As shown in FIGS. 6 and 7, hydrogen is sent from the introduction port 22 to the first space 15, and diffused in a planar direction (in the direction of an arrow W in the drawing) within the first space 15 (first buffer section). The hydrogen diffused and reduced in speed in the first space 15 is passed through the communication port 23 having a large channel area. Then, the hydrogen is struck against the upper surface of the bottom plate 13 (the projection part 23a: see FIGS. 2 and 5), sent to the first recessed section 30 of the second space 16, and diffused in a horizontal direction (the direction of an arrow X in the drawing) in the first recessed section 30 (second buffer section) as shown in FIGS. 8 and 9.

Hydrogen from the communication port 23 hits the upper surface of the bottom plate 13, whereby its diffusion along the horizontal direction (the direction of the arrow X in the drawing) becomes easy. Further, the channel area of the communication port 23 is set to be large, so that hydrogen flowing to the second buffer section diffuses more easily than hydrogen supplied to the first buffer section.

Hydrogen diffused and reduced in speed in the first recessed section 30 is distributed to, and flowed through, the plurality of channels 26 of the block group 25, as shown in FIGS. 8 and 9. In the plurality of channels 26, the width H of the channel 26 distant from the projection part 23a is large compared with the width h of the channel 26 close to the projection part 23a, as stated earlier (as shown in FIG. 5). Thus, the hydrogen is uniformly distributed to the channels 26 (in the direction of an arrow Y in FIG. 9), irrespective of the distance from the projection part 23a. The hydrogen uniformly distributed to the channels 26 flows downward (in a direction intersecting the direction of flow through the channel 26; in the direction of an arrow Z in the drawings) from the fine opening 24, and is supplied to the anode fluid channel 6 (see FIG. 8) of the cell 11 (see FIG. 8).

In the fuel cell 1 in which hydrogen is supplied to the cell stack 3 via the external manifold 2, therefore, hydrogen supplied from the introduction port 22 is diffused in the first buffer section, and is then further diffused in the second buffer section. Then, the hydrogen is uniformly dispersed to the channels 26 of the block group 25. Thus, the amounts of the hydrogen flowing through the channels 26 are uniformized, and the hydrogen is sent to the fine openings 24. Hence, hydrogen can be uniformly supplied to each cell 11, without the need to upsize the manifold, for example, by providing a large diffusion space, that is, even when the manifold is downsized.

A second embodiment of the present invention will be described based on FIGS. 10 and 11.

Figure 10:
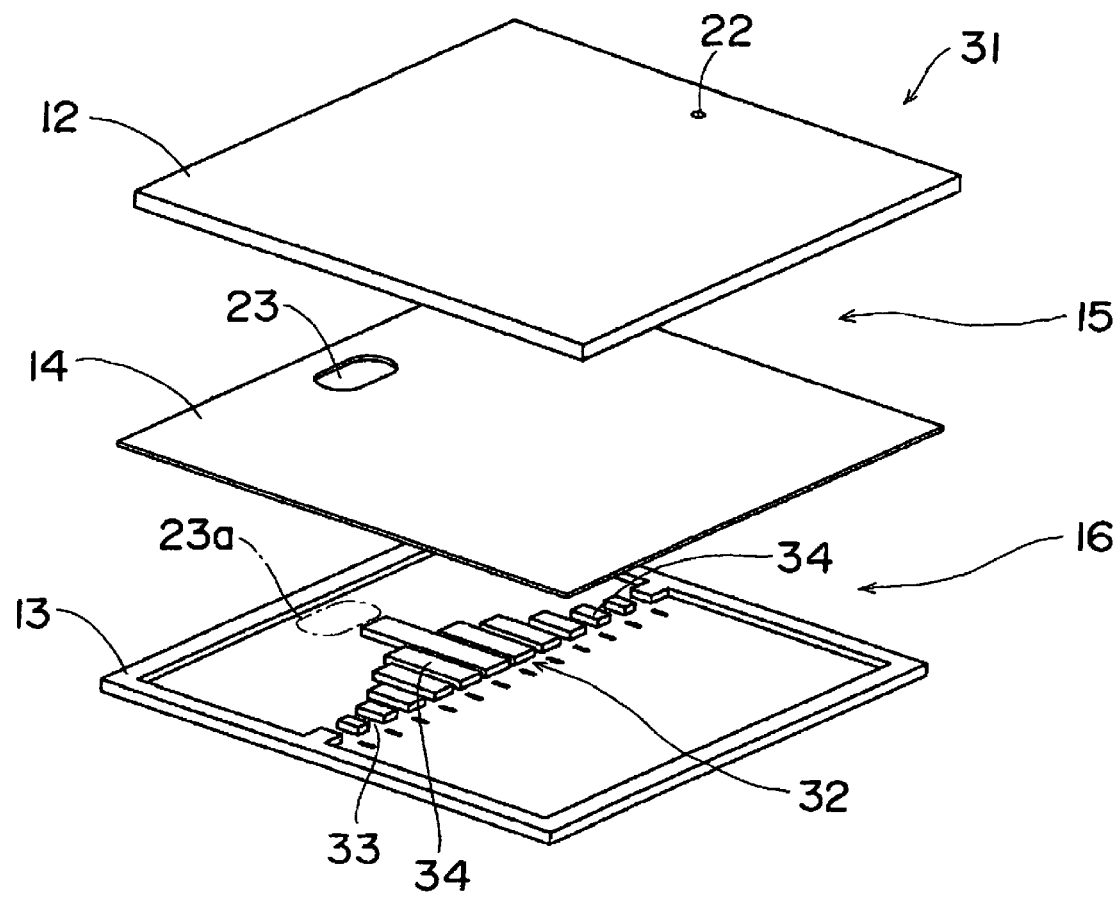
FIG. 10 is an exploded perspective view of an external manifold of a fuel cell according to a second embodiment of the present invention.

FIG. 10 shows an exploded perspective of an external manifold of a fuel cell according to a second embodiment of the present invention. FIG. 11 shows the appearance of the inner surface of a bottom plate. The fuel cell of the second embodiment is different from that of the first embodiment in the shape of a block group formed at the bottom plate of the external manifold. Thus, the same members as the members shown in FIGS. 1 to 9 are assigned the same numerals as in FIGS. 1 to 9, and duplicate explanations are omitted.

As shown in the drawings, a block group 32 is formed on the upper surface of a bottom plate 13 between a projection part 23a of a communication port 23 and fine openings 24. Channels 33 for dispersing hydrogen, which has been supplied from the communication port 23, to the fine openings 24 are formed by the block group 32. As in the first embodiment, a second space 16 formed by the bottom plate 13 and a partition plate 14 is divided into a first recessed section 30 on the side of the projection part 23a and a second recessed section 28 on the side of the fine openings 24, with the block group 32 being the boundary between the first recessed section 30 and the second recessed section 28.

Figure 11:
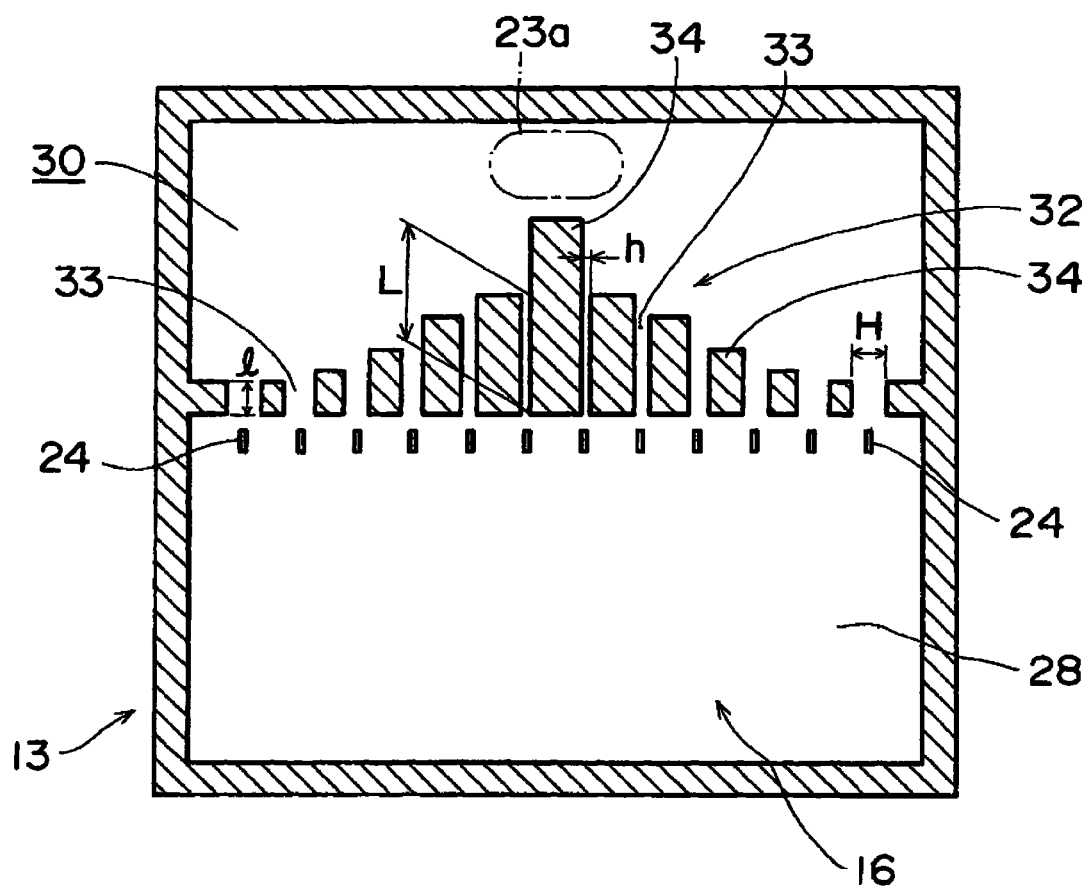
FIG. 11 is a partial cross-sectional view of the inner surface of a bottom plate.

As shown in FIG. 11, the block group 32 comprises a plurality of blocks 34 arranged parallel, and the channels 33 are defined between the blocks 34. The widths (in the right-and-left direction in the drawing) of the blocks 34 close to the projection part 23a are larger than the widths of the blocks 34 distant from the projection part 23a. In other words, the width H of the channel 33 distant from the projection part 23a is larger than the width h of the channel 33 close to the projection part 23a, and a pressure loss in the channel 33 distant from the projection part 23a is rendered smaller.

Moreover, the lengths (in the up-and-down direction in the drawing) of the blocks 34 close to the projection part 23a are larger than the lengths of the blocks 34 distant from the projection part 23a. In other words, the length l of the channel 33 distant from the projection part 23a is smaller than the length L of the channel 33 close to the projection part 23a, and a pressure loss in the channel 33 distant from the projection part 23a is rendered smaller.

The widths of the plurality of blocks 34 of the block group 32 can be set to be the same to render the widths of the channels the same spacing, with the lengths of the channels being varied.

By varying the widths and lengths of the channels 33, the amounts of hydrogen flowing from the channels 33 to the fine openings 24 are distributed uniformly, regardless of the distances from the projection part 23a. The hydrogen distributed uniformly to the fine openings 24 flows downward (in a direction intersecting the direction of flow through the channel 33) from the fine openings 24, and is supplied to an anode fluid channel 6 (see FIG. 8) of each cell 11 (see FIG. 1).

In the fuel cell in which hydrogen is supplied to a cell stack 3 via an external manifold 31, therefore, hydrogen supplied from an introduction port 22 is diffused in a first buffer section, and is then further diffused in a second buffer section. Then, the hydrogen is uniformly dispersed to the channels 33 of the block group 32. Thus, the amounts of the hydrogen flowing through the channels 33 are uniformized, and the hydrogen is sent to the fine openings 24. Hence, hydrogen can be uniformly supplied to each cell 11, without the need to upsize the manifold, for example, by providing a large diffusion space, that is, even when the manifold is downsized.

Figure 12:
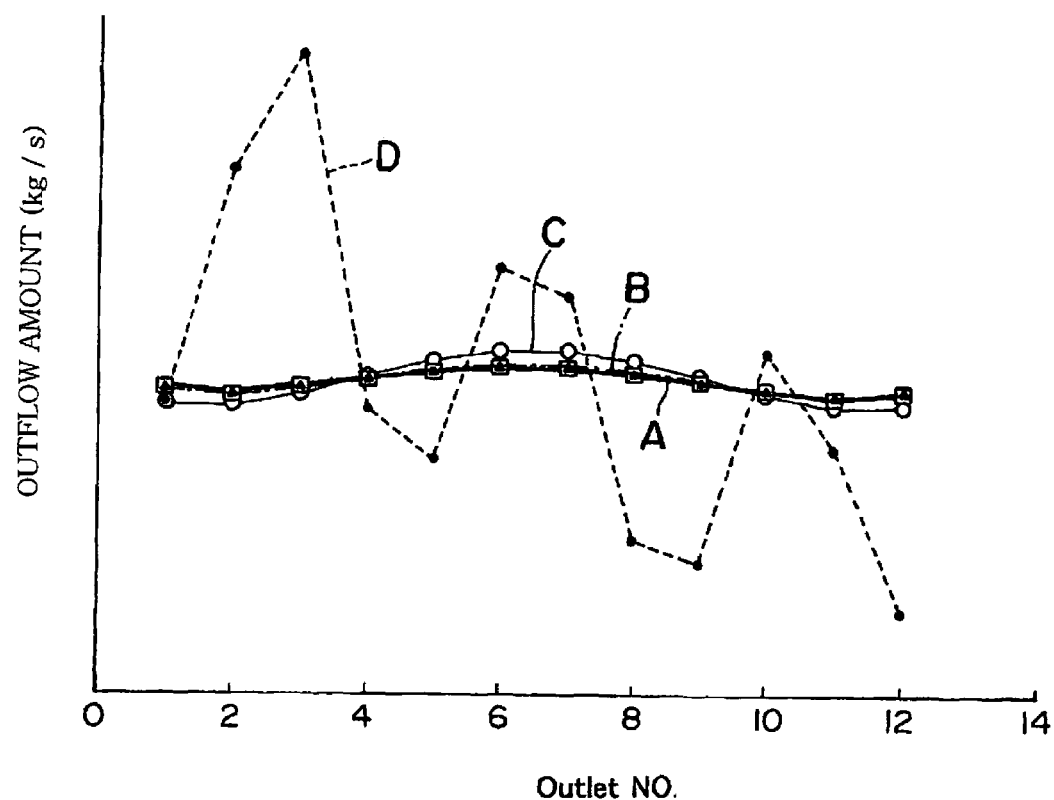
FIG. 12 is a distribution graph of the outflow amounts of hydrogen flowing through fine openings.

The status of the outflow amount of hydrogen will be explained based on FIG. 12. FIG. 12 shows the distribution of the outflow amounts of hydrogen flowing through the fine openings. In the drawing, the ordinate represents the outflow amount (kg/s) of hydrogen, and the abscissa represents the corresponding position (Outlet No.) of the fine opening.

The flow rate indicated by a thick solid line A (□) represents the distribution of the outflow amount in the external manifold of the first embodiment.

The flow rate indicated by a dashed dotted line B (▲) represents the distribution of the outflow amount when the partition plate is removed and the widths of the channels are rendered nonuniform in the external manifold of the first embodiment.

The flow rate indicated by a thin solid line C (○) represents the distribution of the outflow amount when the partition plate is removed and the widths of the channels are rendered the same in the external manifold of the first embodiment.

The flow rate indicated by a short dashed line D (●) represents the distribution of the outflow amount in an external manifold only having a partition plate between a top plate and a bottom plate (comparative example).

When the standard deviation of the comparative example (short dashed line D) was taken as 100, the standard deviation for the thick solid line A (first embodiment) was about 6.09, the standard deviation for the dashed dotted line B was about 6.75, and the standard deviation for the thin solid line C was about 13.60.

When the difference between the maximum value and the minimum value of the flow rate from the fine openings in the comparative example (short dashed line D) was taken as 100, that for the thick solid line A (first embodiment) was 5.23, that for the dashed dotted line B was 5.50, and that for the thin solid line C was 10.10.

It turns out, therefore, that hydrogen can be uniformly supplied by applying the external manifold of the first embodiment, or the manifold in which the partition plate is removed and the widths of the channels are rendered nonuniform in the external manifold of the first embodiment. It is also found that even when the manifold having the widths of the channels rendered equal is applied, the variation is decreased to nearly one-tenth that of the comparative example, meaning that hydrogen can be supplied in a nearly uniform state.

As clear from the results of FIG. 12, the use of the external manifolds of the first embodiment and the second embodiment is found to be capable of uniformly supplying hydrogen to each cell 11 (see FIG. 1).

A third embodiment of the present invention will be described based on FIG. 13.

Figure 13:
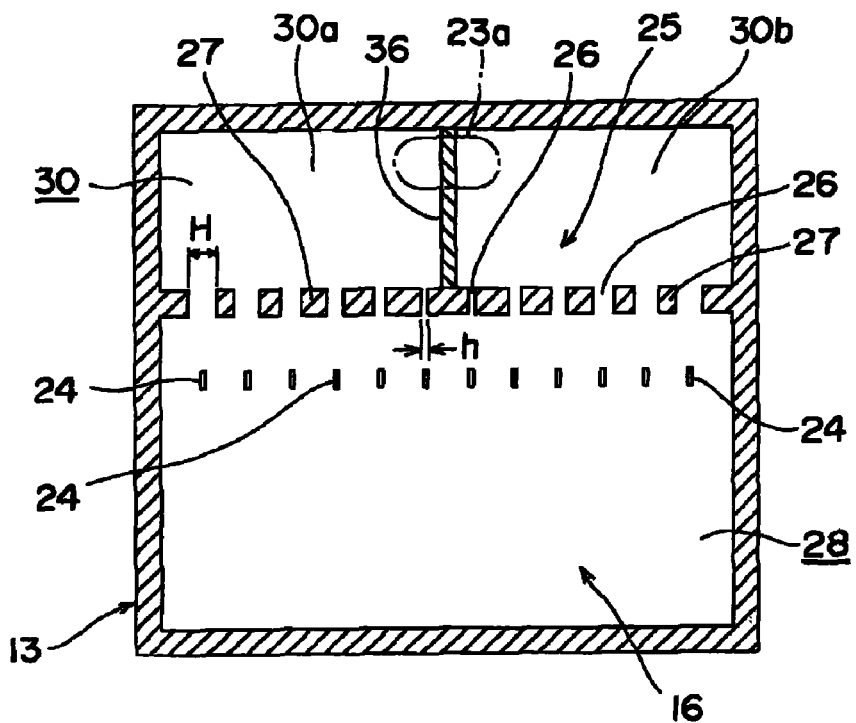
FIG. 13 is a partial cross-sectional view of the inner surface of a bottom plate of an external manifold of a fuel cell according to a third embodiment of the present invention.

FIG. 13 shows the appearance of the inner surface of a bottom plate of an external manifold of a fuel cell according to a third embodiment of the present invention. The same members as the members of the bottom plate 13 shown in FIG. 5 (first embodiment) are assigned the same numerals as in FIG. 5, and duplicate explanations are omitted.

A first recessed section 30 is present which is a second space on a side opposite to fine openings 24 across a block group 25. A separating plate 36 for separating the first recessed section 30 into two spaces 30a and 30b in the direction of parallel arrangement of the fine openings 24 (in the right-and-left direction in the drawing) is provided, and the separating plate 36 is disposed in a state in which it divides a projection part 23a into two portions. That is, the separating plate 36 is designed to portion out hydrogen, which has been supplied from a communication hole 23 (see FIG. 2), between the two spaces 30a and 30b. Since the hydrogen is thus portioned out by the separating plate 36 between the two spaces 30a and 30b, the hydrogen can be dispersed in a uniform state to the plurality of fine openings 24.

It is also possible to provide the separating plate 36 on the bottom plate 13 of the second embodiment shown in FIG. 11.

A fourth embodiment of the present invention will be described based on FIG. 14.

Figure 14:
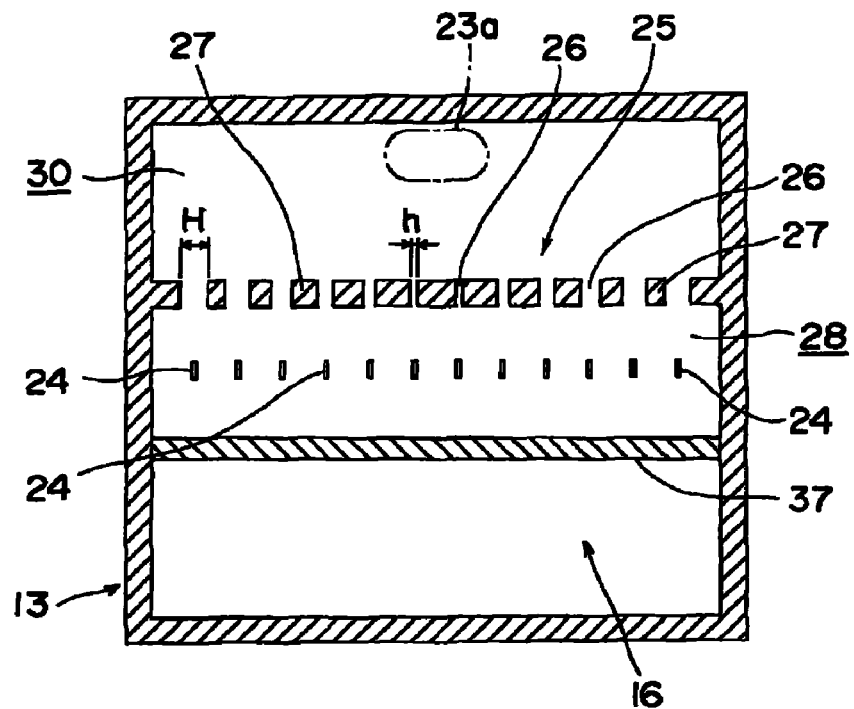
FIG. 14 is a partial cross-sectional view of the inner surface of a bottom plate of an external manifold of a fuel cell according to a fourth embodiment of the present invention.

FIG. 14 shows the appearance of the inner surface of a bottom plate of an external manifold of a fuel cell according to a fourth embodiment of the present invention. The same members as the members of the bottom plate 13 shown in FIG. 5 (first embodiment) are assigned the same numerals as in FIG. 5, and duplicate explanations are omitted.

A second recessed section 28, which is a second space on a side opposite to a block group 25 across fine openings 24, is present. A fluid blocking wall 37 extending along the direction of parallel arrangement of the fine openings 24 is provided in the second recessed section 28. Hydrogen flowing through channels 26 of the block group 25 is sent to the plurality of fine openings in the second recessed section 28 which has been restricted to a narrow space between the fluid blocking wall 37 and the block group 25. Thus, an adequate pressure of supply of hydrogen to the fine openings 24 is ensured, and hydrogen can be reliably supplied to the fine openings.

It is also possible to provide the fluid blocking wall 37 on the bottom plate 13 of the second embodiment shown in FIG. 11, and on the bottom plate 13 of the third embodiment shown in FIG. 13.

A fifth embodiment of the present invention will be described based on FIGS. 15 to 18.

Figure 15:
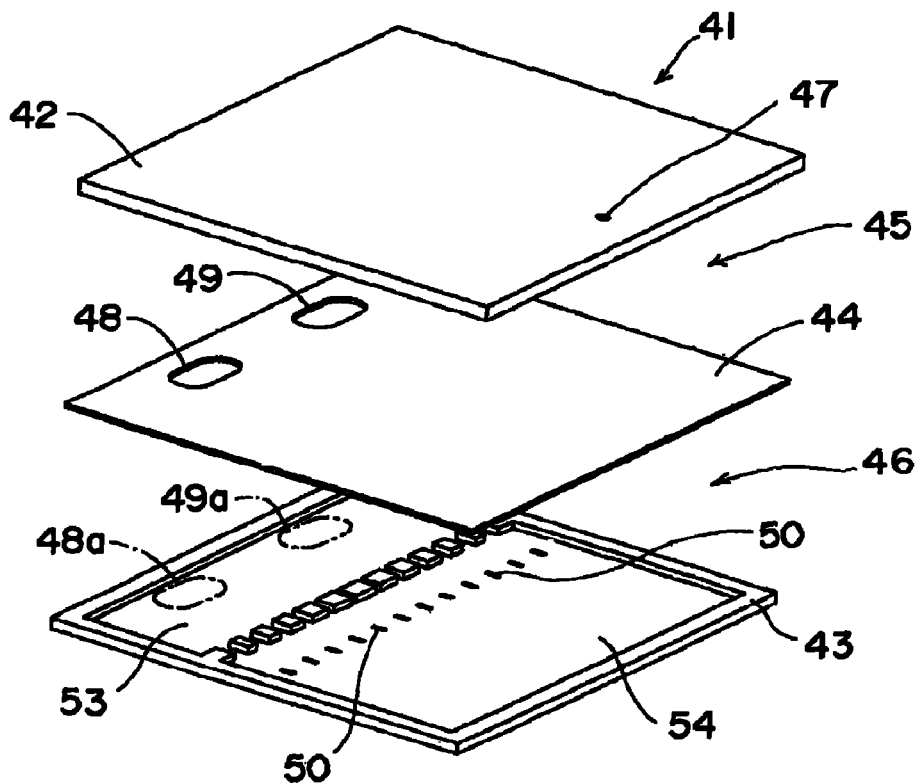
FIG. 15 is an exploded perspective view of an external manifold of a fuel cell according to a fifth embodiment of the present invention.
Figure 16:
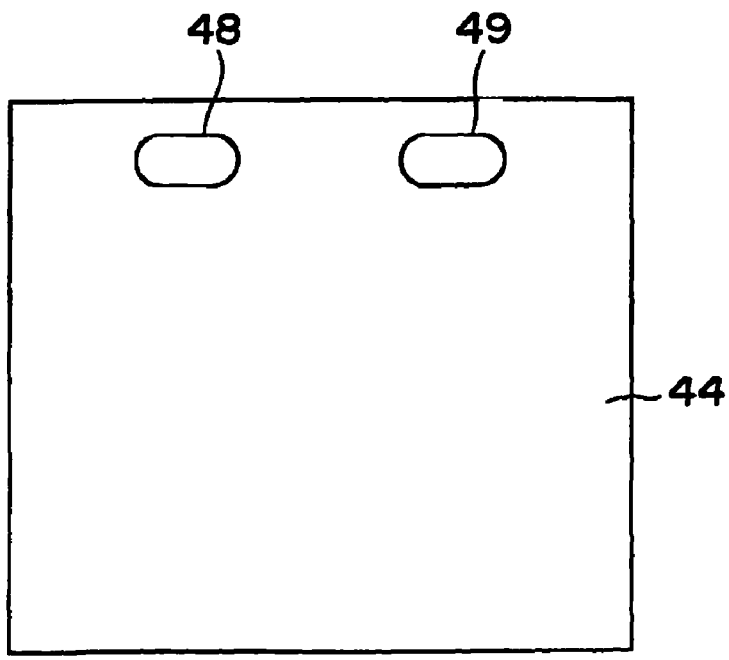
FIG. 16 is a front view of a partition plate.
Figure 17:
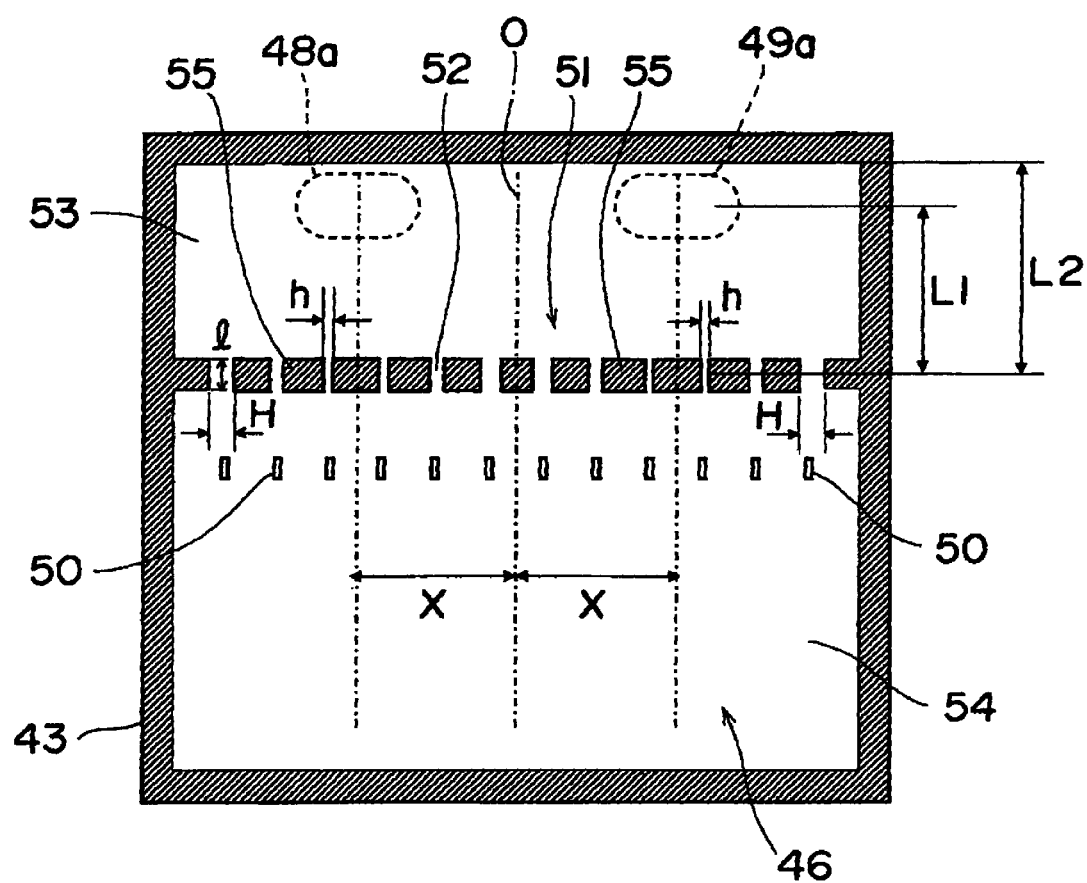
FIG. 17 is a partial cross-sectional view of the inner surface of a bottom plate.
Figure 18:
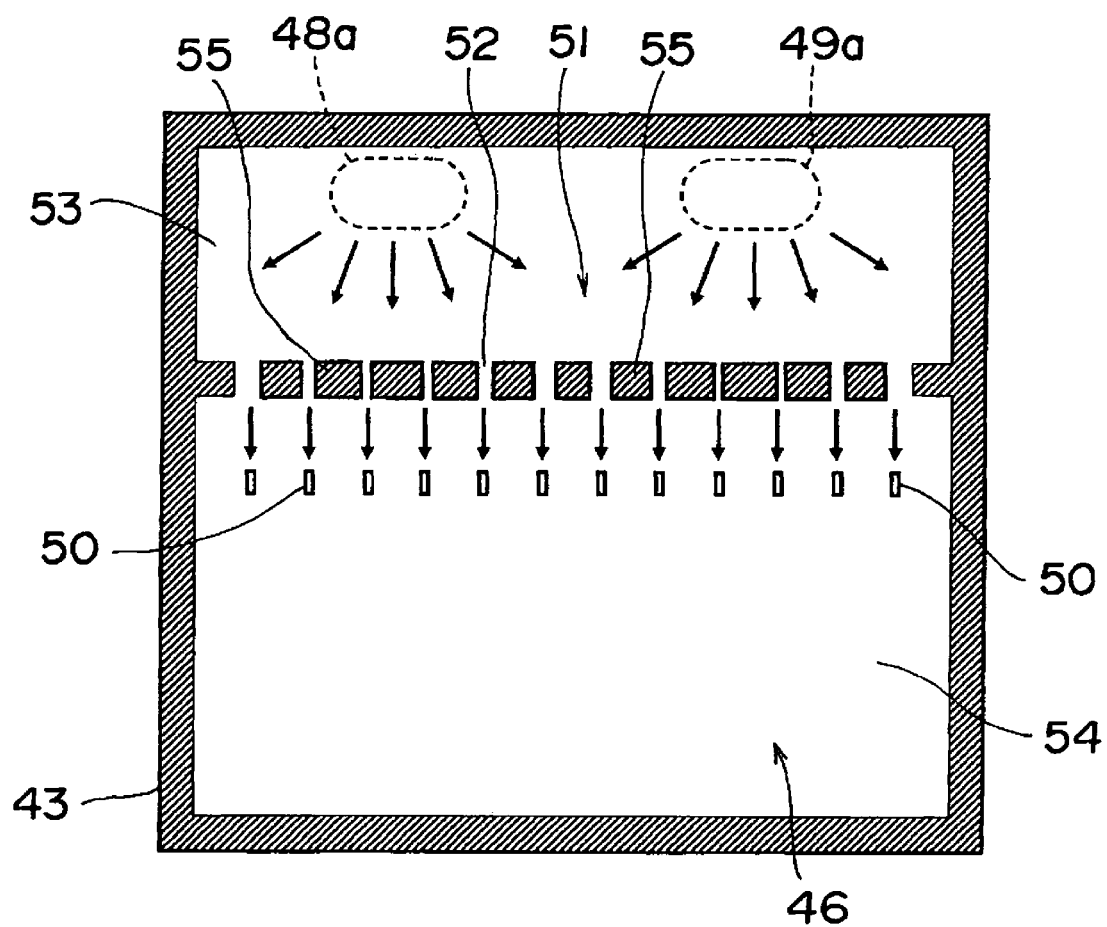
FIG. 18 is a partial cross-sectional view of the inner surface of the bottom plate, showing the status of fuel flowing on the bottom plate.

FIG. 15 shows an exploded perspective of an external manifold of a fuel cell according to a fifth embodiment of the present invention. FIG. 16 shows the appearance of a partition plate. FIG. 17 shows the appearance of the inner surface of a bottom plate. FIG. 18 shows the status of fuel flowing on the bottom plate. The illustrated external manifold is provided in the cell stack 3 shown in FIG. 1.

As shown in FIG. 15, an external manifold 41 has a top plate 42 and a bottom plate 43, and a flow-through space for hydrogen is formed between the inner surface of the top plate 42 and the upper surface of the bottom plate 43. A partition plate 44 is provided between the top plate 42 and the bottom plate 43, and the flow-through space for hydrogen is partitioned by the partition plate 44 into a first space 45 on the side of the top plate 42 and a second space 46 on the side of the bottom plate 43.

A concavity for forming the flow-through space is formed in the inner surface of the top plate 42, and the top plate 42 is provided with an introduction port 47 for introduction of hydrogen. A fuel supply portion (not shown) is connected to the introduction port 47. As shown in FIGS. 15 and 16, the partition plate 44 is provided with communication ports 48, 49 as second introduction ports, and the communication ports 48 and 49 are provided parallel along the direction of parallel arrangement of fine openings 50 to be described later.

As shown in FIGS. 15 and 17, hydrogen is supplied toward the upper surface of the bottom plate 43 through the communication ports 48, 49 of the partition plate 44, and the supplied hydrogen is brought into contact with the upper surface of the bottom plate 43 in projection parts 48a, 49a (second projection parts) of the communication ports 48, 49 in the stacking direction, and is supplied to the second space 46. A plurality of (12 in the illustrated embodiment) fine openings 50 facing the anode fluid channels of cells 11 (see FIG. 1) are formed in the upper surface of the bottom plate 43. The fine openings 50 are formed, for example, such that one of or a plurality of the fine openings 50 is or are formed per cell 11 (see FIG. 1).

In the illustrated embodiment, an example of forming 12 of the fine openings 50 in a row is described. However, it is possible to form a multiplicity of the fine openings 50, such as 12 of the fine openings 50 each in three rows.

A block group 51 is formed on the upper surface of the bottom plate 43 between the projection parts 48a, 49a and the fine openings 50, and channels 52 for dispersing hydrogen, which has been supplied from the communication ports 48, 49, to the fine openings 50 are formed by the block group 51. The second space 46 formed by the bottom plate 43 and the partition plate 44 is divided into a first recessed section 53 on the side of the projection parts 48a, 49a and a second recessed section 54 on the side of the fine openings 50, with the block group 51 being the boundary between the first recessed section 53 and the second recessed section 54.

The positions of the communication ports 48, 49, namely, the positions of the projection parts 48a, 49a shown in FIG. 17, are set to be such that a distance L1 from the block group 51 to the projection parts 48a, 49a is close to the same distance as a distance L2 from the block group 51 to the end of the first recessed section 53, which is the end of the second space, with the projection parts 48a, 49a being interposed in the distance L2. That is, the distance L1 from the block group 51 to the projection parts 48a, 49a is set to be more than a half of the distance L2 from the block group 51 to the end of the first recessed section 53.

Since the distance L1 from the block group 51 to the projection parts 48a, 49a is set to be more than a half of the distance L2 from the block group 51 to the end of the first recessed section 53, the distance over which hydrogen supplied from the communication ports 48, 49 is guided to each channel 52 of the block group 51 can be ensured amply. Thus, dispersion of hydrogen within the first recessed section 53, which is a limited space, can be performed appropriately.

The positions of the communication ports 48, 49, namely, the positions of the projection parts 48a, 49a shown in FIG. 17, are set at positions at distances X in line symmetry with respect to a center line O. Since hydrogen is supplied from the two communication ports 48 and 49, hydrogen can be supplied to the plurality of channels 52 (fine openings 50) in a minimal variation state.

As shown in FIG. 17, the block group 51 comprises a plurality of blocks 55 arranged parallel, and the channels 52 are defined between the blocks 55. The widths (in the right-and-left direction in the drawing) of the blocks 55 close to the projection parts 48a, 49a are larger than the widths of the blocks 55 distant from the projection parts 48a, 49a. In other words, the width H of the channel 52 distant from the projection parts 48a, 49a is larger than the width h of the channel 52 close to the projection parts 48a, 49a, and a pressure loss in the channel 52 distant from the projection parts 48a, 49a is rendered smaller.

Because of the above configuration, the amounts of hydrogen flowing from the channels 52 to the fine openings 50 are distributed uniformly, regardless of the distances from the projection parts 48a, 49a, as shown in FIG. 18. The hydrogen distributed uniformly to the fine openings 50 flows downward (in a direction intersecting the direction of flow through the channel 52) from the fine openings 50, and is supplied to the anode fluid channel 6 (see FIG. 8) of each cell 11 (see FIG. 1).

The widths of the plurality of blocks 55 of the block group 51 can be set to be the same to render the widths of the channels the same spacing.

A sixth embodiment of the present invention will be described based on FIG. 19.

Figure 19:
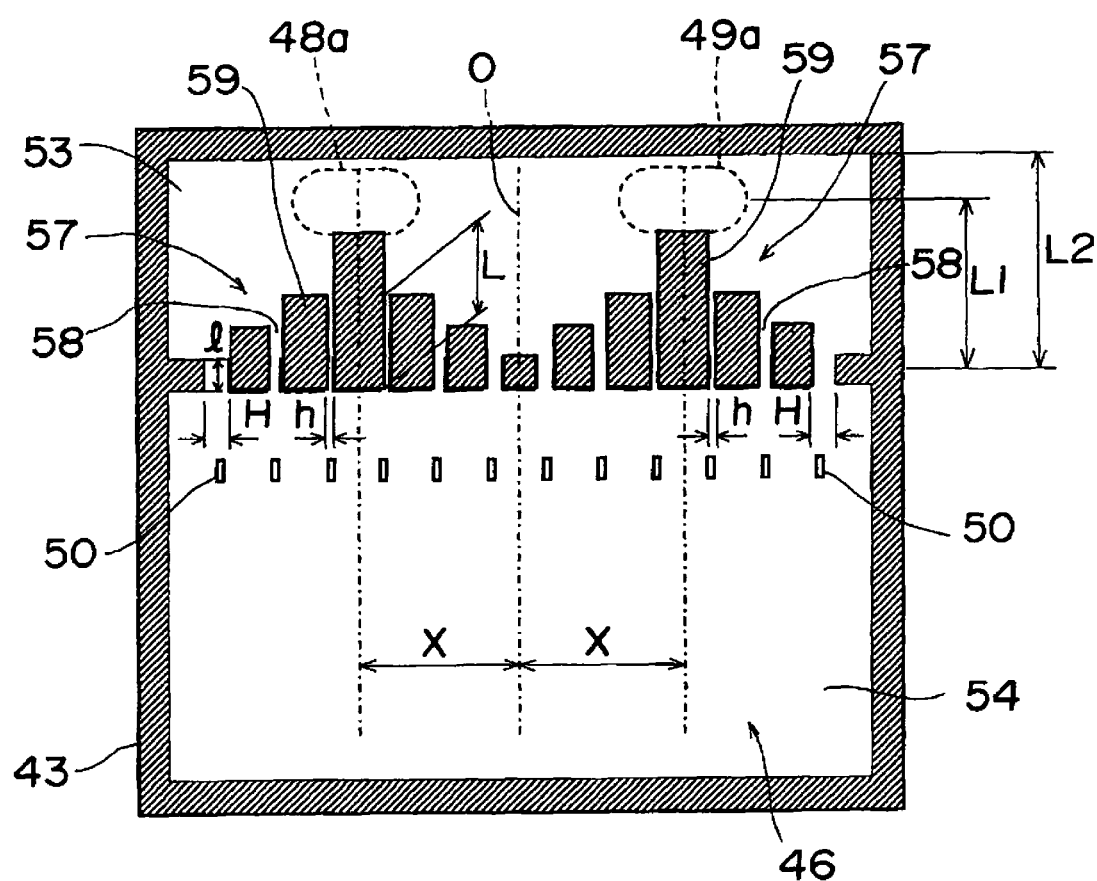
FIG. 19 is a partial cross-sectional view of the inner surface of a bottom plate of an external manifold of a fuel cell according to a sixth embodiment of the present invention.

FIG. 19 shows the appearance of the inner surface of a bottom plate of an external manifold of a fuel cell according to a sixth embodiment of the present invention. The fuel cell of the sixth embodiment is different from that of the fifth embodiment in the shape of a block group formed at the bottom plate of the external manifold. Thus, the same members as the members shown in FIG. 17 are assigned the same numerals as in FIG. 17, and duplicate explanations are omitted.

As shown in the drawing, a block group 57 is formed on the upper surface of a bottom plate 43 between projection parts 48a, 49a of communication ports 48, 49 and fine openings 50. Channels 58 for dispersing hydrogen, which has been supplied from the communication ports 48, 49, to the fine openings 50 are formed by the block group 57. As in the fifth embodiment, a second space 46 formed by the bottom plate 43 and a partition plate 44 is divided into a first recessed section 53 on the side of the projection parts 48a, 49a and a second recessed section 54 on the side of the fine openings 24, with the block group 57 being the boundary between the first recessed section 53 and the second recessed section 54.

The block group 57 comprises a plurality of blocks 59 arranged parallel, and the channels 58 are defined between the blocks 59. The widths (in the right-and-left direction in the drawing) of the blocks 59 close to the projection parts 48a, 49a are larger than the widths of the blocks 59 distant from the projection parts 48a, 49a. In other words, the width H of the channel 58 distant from the projection parts 48a, 49a is larger than the width h of the channel 58 close to the projection parts 48a, 49a, and a pressure loss in the channel 58 distant from the projection parts 48a, 49a is rendered smaller.

Moreover, the lengths (in the up-and-down direction in the drawing) of the blocks 59 close to the projection parts 48a, 49a are larger than the lengths of the blocks 59 distant from the projection parts 48a, 49a. In other words, the length l of the channel 58 distant from the projection parts 48a, 49a is smaller than the length L of the channel 58 close to the projection parts 48a, 49a, and a pressure loss in the channel 58 distant from the projection parts 48a, 49a is rendered smaller. By varying the widths and lengths of the channels 58, the amounts of hydrogen flowing from the channels 58 to the fine openings 50 are distributed uniformly, regardless of the distances from the projection parts 48a, 49a.

The widths of the plurality of blocks 59 of the block group 57 can be set to be the same to render the widths of the channels 58 the same spacing, with the lengths of the channels being varied.

A seventh embodiment of the present invention will be described based on FIG. 20.

Figure 20:
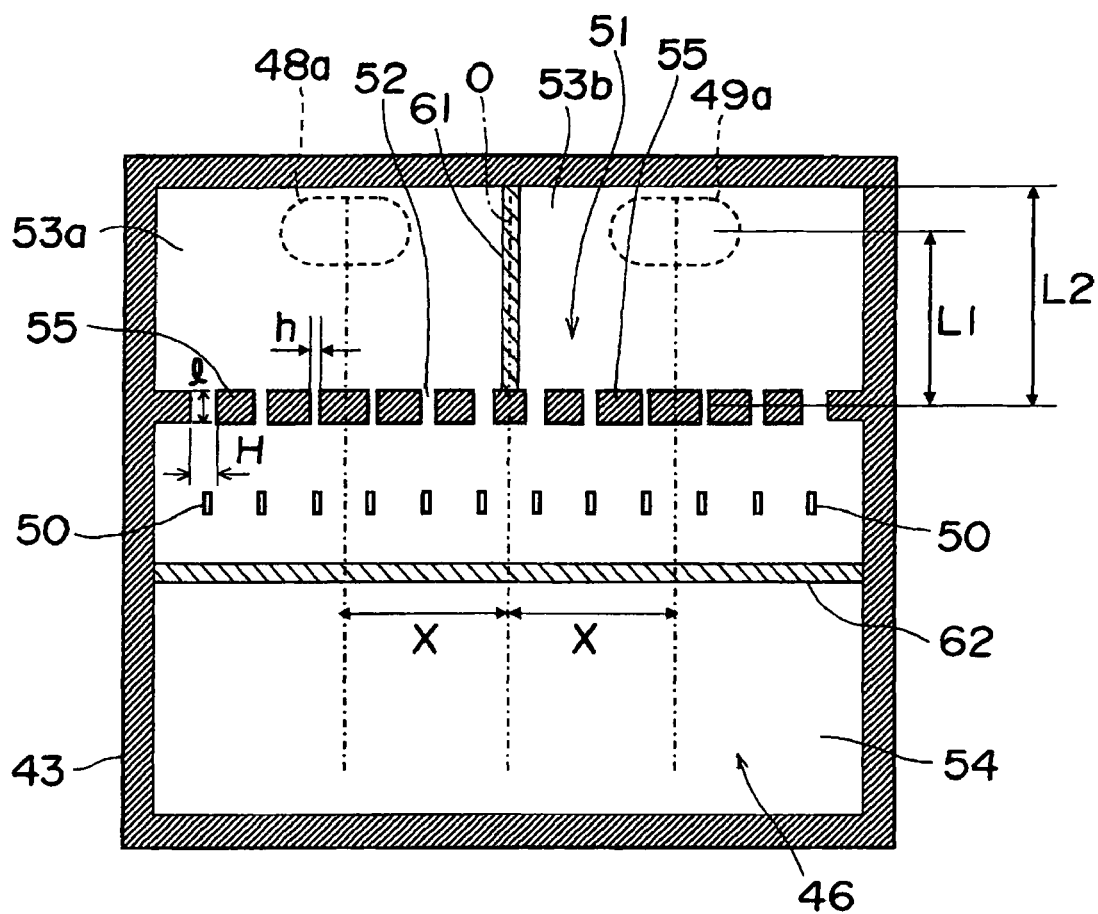
FIG. 20 is a partial cross-section view of the inner surface of a bottom plate of an external manifold of a fuel cell according to a seventh embodiment of the present invention.

FIG. 20 shows the appearance of the inner surface of a bottom plate of an external manifold of a fuel cell according to a seventh embodiment of the present invention. The same members as the members of the bottom plate 43 shown in FIG. 17 (fifth embodiment) are assigned the same numerals as in FIG. 17, and duplicate explanations are omitted.

A first recessed section 53 is present which is a second space on a side opposite to fine openings 50 across a block group 51. A separating wall 61 for separating the first recessed section 53 into two spaces 53a and 53b in the direction of parallel arrangement of the fine openings 50 (in the right-and-left direction in the drawing) is provided, and the separating wall 61 separates the first recessed section 53 into the two spaces 53a and 53b in correspondence with projection parts 48a and 49a. Since hydrogen is thus sent to the two spaces 53a and 53b because of the separating wall 61, the hydrogen can be dispersed reliably and in a uniform state to the plurality of fine openings 24.

A second recessed section 54, which is a second space on a side opposite to the block group 51 across the fine openings 50, is present. A fluid blocking wall 62 extending along the direction of parallel arrangement of the fine openings 50 is provided in the second recessed section 54. Hydrogen flowing through channels 52 of the block group 51 is sent to the plurality of fine openings 50 in the second recessed section 54 which has been restricted to a narrow space between the fluid blocking wall 62 and the block group 51. Thus, an adequate pressure of supply of hydrogen to the fine openings 50 is ensured, and hydrogen can be reliably supplied to the fine openings 50.

Alternatively, one of the separating wall 61 and the fluid blocking wall 62 can be provided. Moreover, the separating wall 61 and (or) the fluid blocking wall 62 can be provided on the bottom plate 43 of the sixth embodiment shown in FIG. 19.

In the respective embodiments described above, hydrogen is used as an example of the anode fluid supplied. However, the present invention can also practiced by to the supply of other types of fuels, including methanol.

The present invention can be utilized in the industrial field of fuel cells in which an anode fluid is supplied from a manifold to each cell of a cell stack.

The invention claimed is:

1. A fuel cell, comprising:
unit cells each having an anode and a cathode joined together via an electrolyte membrane;
a cell stack having a plurality of stacked cells, each of the cells having one of the unit cells and a separator provided with an anode fluid channel; and
a manifold for supplying an anode fluid to a position of each cell which faces the anode fluid channel, the manifold comprising:
a top plate provided with at least one introduction port through which the anode fluid is introduced;
a bottom plate provided with a plurality of fine openings facing the anode fluid channels, a flow-through space for the anode fluid being formed between an inner surface of the top plate and an upper surface of the bottom plate, the introduction port projecting onto a projection part on the upper surface of the bottom plate positioned in the flow-through space on one side of the fine openings so that when the anode fluid is introduced into the introduction port the anode fluid is brought into contact with the projection part; and
a block group arranged on the upper surface of the bottom plate between the fine openings and the projection part on the upper surface of the bottom plate, the block group comprising a plurality of individual blocks spaced apart from one another to form a plurality of individual channels for dispersing into the fine openings the anode fluid;
wherein when the anode fluid is introduced into the introduction port and brought into contact with the projection part on the upper surface of the bottom plate, the flow rate of the anode fluid is lowered and the anode fluid flows at the lowered flow rate through the individual channels formed by the blocks and is dispersed into the fine openings.

2. A fuel cell according to claim 1; wherein the channels are formed by the blocks so that some of the channels are disposed at a first distance from the projection part on the upper surface of the bottom plate and the other of the channels are disposed at a second distance from the projection part greater than the first distance; and wherein widths of the channels disposed at the second distance from the projection part are larger than widths of the channels at the first distance from the projection part.

3. A fuel cell according to claim 1; wherein the channels are formed by the blocks so that some of the channels are disposed at a first distance from the projection part on the upper surface of the bottom plate and the other of the channels are disposed at a second distance from the projection part greater than the first distance; and wherein lengths of the channels disposed at the second distance from the projection part are smaller than lengths of the channels at the first distance from the projection part.

4. A fuel cell according to claim 1; wherein the manifold further comprises a separating plate that separates the flow-through space into a plurality of spaces in a direction of parallel arrangement of the fine openings for portioning out the anode fluid between the plurality of spaces, the separating plate being disposed on a side opposite to the fine openings across the block group.

5. A fuel cell according claim 1; wherein the at least one introduction port comprises a plurality of the introduction ports provided along a direction of parallel arrangement of the fine openings.

6. A fuel cell according to claim 5; wherein the manifold further comprises a separating wall that separates the flow-through space into a plurality of spaces in the direction of parallel arrangement of the fine openings in correspondence with the plurality of introduction ports.

7. A fuel cell according to claims 1, wherein the manifold further comprises a fluid blocking wall provided in the flow-through space on a side opposite to the block group across the fine openings.

8. A fuel cell according to claim 1; wherein a distance from the block group to the projection part on the upper surface of the bottom plate is more than a half of a distance from the block group to an end of the flow-through space, the projection part being interposed between the block group and the end of the flow-through space.

9. A fuel cell according to claim 1; wherein the manifold is configured so that the anode fluid dispersed to the fine openings flows in a direction intersecting a flow direction of the anode fluid flowing through the channels formed by the blocks.

10. A fuel cell, comprising:
unit cells each having an anode and a cathode joined together via an electrolyte membrane;
a cell stack having a plurality of stacked cells, each of the cells having one of the unit cells and a separator provided with an anode fluid channel; and
a manifold for supplying an anode fluid to a position of each cell which faces the anode fluid channel, the manifold comprising:
a top plate provided with a first introduction port through which the anode fluid is introduced;
a bottom plate provided with a plurality of fine openings facing the anode fluid channels, a flow-through space for the anode fluid being formed between an inner surface of the top plate and an upper surface of the bottom plate;
a partition plate that partitions the flow-through space into a first space on a side of the top plate and a second space on a side of the bottom plate, the partition plate having a at least one second introduction port at a position different from a position of the introduction port, the second introduction port projecting onto a projection part on the upper surface of the bottom plate positioned in the flow-through space on one side of the fine openings so that when the anode fluid is introduced into the first introduction port the anode fluid flows into the first space, through the second introduction port and into the second space and is brought into contact with the projection part; and
a block group arranged on the upper surface of the bottom plate between the fine openings and the projection part on the upper surface of the bottom plate, the block group comprising a plurality of individual blocks spaced apart from one another to form a plurality of individual channels for dispersing into the fine openings the anode fluid;
wherein when the anode fluid is introduced into the first introduction port and flows into the first space the flow rate of the anode fluid is lowered to a first flow rate and the anode fluid at the first flow rate is passed through the second introduction port and brought into contact with the projection part on the upper surface of the bottom plate to further lower the flow velocity of the anode fluid to a second flow rate lower than the first flow rate, and the anode fluid at the second flow rate flows through the individual channels formed by the blocks and is dispersed into the fine openings.

11. A fuel cell according to claim 10; wherein a channel area of the second introduction port is larger than a channel area of the first introduction port.

12. A fuel cell according to claim 10; wherein the channels are formed by the blocks so that some of the channels are disposed at a first distance from the projection part on the upper surface of the bottom plate and the other of the channels are disposed at a second distance from the projection part greater than the first distance; and wherein widths of the channels disposed at the second distance from the projection part are larger than widths of the channels at the first distance from the projection part.

13. A fuel cell according to claim 10; wherein the channels are formed by the blocks so that some of the channels are disposed at a first distance from the projection part on the upper surface of the bottom plate and the other of the channels are disposed at a second distance from the projection part greater than the first distance; and wherein lengths of the channels disposed at the second distance from the projection part are smaller than lengths of the channels at the first distance from the projection part.

14. A fuel cell according to claim 10, wherein the manifold further comprises a separating plate that separates the flow-through space into a plurality of spaces in a direction of parallel arrangement of the fine openings for portioning out the anode fluid between the plurality of spaces, the separating plate being disposed on a side opposite to the fine openings across the block group.

15. A fuel cell according to claim 10; wherein the at least one second introduction port comprises a plurality of second introduction ports along a direction of parallel arrangement of the fine openings.

16. A fuel cell according to claim 10, wherein the manifold further comprises a separating wall that separates the second space into a plurality of spaces in the direction of parallel arrangement of the fine openings in correspondence with the second introduction port.

17. A fuel cell according to claim 10; wherein the manifold further comprises a fluid blocking wall provided on a side opposite to the block group across the fine openings.

18. A fuel cell according to claim 10; wherein a distance from the block group to the projection part on the upper surface of the bottom plate is greater than a half of a distance from the block group to an end of the second space, the projection part being interposed between the block group and the end of the second space.

19. A fuel cell according to claim 10; wherein the manifold is configured so that the anode fluid dispersed to the fine openings flows in a direction intersecting a flow direction of the anode fluid flowing through the channels formed by the blocks.

20. A fuel cell comprising:
a plurality of cell units; and
a manifold for uniformly supplying an anode fluid to each of the cell units, the manifold having a feed port through which an anode fluid is supplied, a first buffer section in fluid communication with the feed port for receiving the anode fluid and for reducing a flow rate of the anode fluid, a second buffer section in fluid communication with the first buffer section for receiving the anode fluid from the first buffer section at the reduced flow rate and for further reducing the flow rate of the anode fluid, a block group comprised of a plurality of blocks spaced apart from one another to form a plurality of flow channels in fluid communication with the second buffer section and through which the anode fluid at the further reduced flow rate flows, and an array of fine openings in fluid communication with the cell units for receiving the anode fluid at the further reduced flow rate flowing through the flow channels so that the anode fluid is uniformly supplied to each of the cell units.

21. A fuel cell according to claim 20; wherein the manifold comprises; a first plate member having the feed port; a second plate member having the second buffer section, the blocks and the fine apertures; and a third plate member interposed between the first and second plate members to form the first buffer section between confronting surfaces of the first and third plate members, the third plate member having a communication port for communicating the first buffer section in fluid communication with the second buffer section.

22. A fuel cell according to claim 20; wherein the second buffer section is configured to uniformly disperse the anode fluid at the reduced flow rate to the flow channels of the block group to make uniform the quantities of anode fluid flowing in the flow channels so that the anode fluid is dispersed into the fine openings with sufficient supply pressure and uniformly supplied to each of the cell units.

* * * * *